United States Patent [19]
Akeley

[11] 3,967,504
[45] July 6, 1976

[54] DIFFERENTIAL PRESSURE TRANSMITTER WITH LOW SIDE OVERRANGE PROTECTION

[75] Inventor: Lloyd T. Akeley, Fullerton, Calif.

[73] Assignee: Beckman Instruments, Inc., Fullerton, Calif.

[22] Filed: Apr. 3, 1975

[21] Appl. No.: 564,689

[52] U.S. Cl. ............ 73/407 R; 73/205 R; 73/398 R
[51] Int. Cl.² ............ G01L 7/08; G01L 9/10
[58] Field of Search ........ 73/407 R, 205 R, 398 R, 73/398 C, 398 AR, 406, 408, 410; 92/101; 137/501

[56] References Cited
UNITED STATES PATENTS

| | | | |
|---|---|---|---|
| 2,977,991 | 4/1961 | Bauer | 73/407 R |
| 3,289,479 | 12/1966 | Tausch | 73/407 R |
| 3,841,158 | 10/1974 | Hunter | 73/407 R |

*Primary Examiner*—Donald O. Woodiel
*Attorney, Agent, or Firm*—R. J. Steinmeyer; P. R. Harder

[57] ABSTRACT

A differential pressure transmitter of the sensing diaphragm type is disclosed having low side overrange protection in which the central hub of the sensing diaphragm is releasably biased against the free end of the resilient spring in the transmitter body. A valving mechanism is provided so that under conditions of low side overrange, after the sensing diaphragm has separated from the spring, the valving mechanism provides a chamber of nonresilient body walls behind the sensing diaphragm filled with trapped fill fluid so that the sensing diaphragm is not distorted beyond its elastic limit by the high negative differential pressure.

10 Claims, 4 Drawing Figures

DIFFERENTIAL PRESSURE TRANSMITTER WITH LOW SIDE OVERRANGE PROTECTION

BACKGROUND OF THE INVENTION

1. Field of the Invention

This invention relates to sensing diaphragm differential pressure transmitters of the type used to generate a signal, electrical or pneumatic, related to the differential pressure between a high pressure line and a low pressure line each containing a liquid or gaseous process fluid. A typical example of the use of such a device might be a flow measurement installation in which a flow restriction, such as an orifice plate, is positioned in a pipe containing a flowing process fluid. A high pressure line is connected to a high pressure tap immediately upstream of the orifice plate and a low pressure line is likewise connected to a low pressure tap immediately downstream of the orifice plate. The pressure differential between these pressure lines is known to be indicative of the flow rate of the process fluid. The pressures in these lines are caused to act against opposite faces of a sensing diaphragm having a relatively linear spring rate, the periphery of which is secured to the transmitter body to prevent motion. Motion of the central portion of the sensing diaphragm is related to the differential pressure and therefore to the flow rate. A conventional position transducer may then be used to generate a signal indicative of the flow rate.

The accuracy of such transmitters depends in part upon the linearity of the spring-diaphragm assembly. A spring member, having one end affixed to the transmitter body, is typically positioned adjacent the low pressure face of the diaphragm to resist motion of the central portion thereof so that the spring rates of the sensing diaphragm and spring are combined.

Such transmitters are occasionally subject to differential pressures of magnitudes beyond the range of their designed capabilities, usually during installation or repair. This problem is commonly referred to as overranging and, although infrequent, is quite serious because the resulting distortion of the sensing diaphragm often renders the transmitter unpredictably nonlinear in its response to differential pressures and therefore unsuitable for use.

Overranging problems occur in two modes: high side overrange and low side overrange. The present invention relates to the construction and design of such differential pressure transmitters rendering them less susceptible to damage from low side overranging.

Negative differential pressure occurs when the pressure in the low pressure line exceeds the pressure in the high pressure line. Low side overrange occurs when the negative differential pressure exceeds the design limit of the device. This condition can be caused by removal of the high pressure line from the transmitter without removal of the low pressure side, accidental application of an overrange pressure to the low pressure side of the transmitter or by other means.

2. Description of the Prior Art

Differential pressure transmitters of the type to which the instant invention is related are often utilized with either corrosive or contaminated process fluids. It is customary to protect the sensing diaphragm, as well as the process fluid, by use of a fluid filled isolation diaphragm system as follows. The sensing diaphragm is positioned within a chamber filled with a relatively incompressible fill fluid and sealed at each end by isolation diaphragms whose spring rates are designed to be insignificant relative to the effective spring rate of the sensing diaphragm and spring assembly. The pressure from the high pressure process fluid line is applied to one of the isolation diaphragms and the pressure from the low pressure line to the other. In this way the process fluid and sensing diaphragm are isolated from each other without adversely affecting the operation of the transmitter.

One example of the prior art construction of such devices is shown in U.S. Pat. No. 3,277,719 issued on Oct. 11, 1966, which shows a single sensing diaphragm differential pressure transmitter having a fluid filled isolation diaphragm system in which adjustable stops are used to mechanically limit travel of the center portion or hub of the sensing diaphragm under conditions of low pressure overrange. This hub is mechanically secured to the free end of the spring.

The stops are provided for the protection of the spring which supports the sensing diaphragm but do not prevent the fill fluid, under low side overrange conditions, from flexing the sensing diaphragm beyond its elastic limit thereby affecting its linearity. This prior art design relies on the "bottoming out" of the appropriate diaphragm against its backup surface to minimize the damage as described above but this is usually not adequate under high temperature conditions which cause the fill fluid to expand. For clarity, FIG. 3 herein shows a basic transmitter structure, not unlike that of the prior art, including the adjustable stops in order to show the low side overrange problem associated therewith.

The position transducer, whose signal is indicative of the differential pressure applied to the transmitter acts upon a structural member affixed to the free end of the spring.

SUMMARY OF THE INSTANT INVENTION

The present invention avoids the problems associated with low side overrange as described above by providing a differential pressure transmitter design in which the central hub of the sensing diaphragm is not firmly attached to the free end of the spring but is, instead, releasably biased thereagainst. That is, when the pressure in the high pressure line exceeds the pressure in the low pressure line (referred to herein as positive differential pressure) the sensing diaphragm moves against the spring, partially compressing it. Under conditions of negative differential pressure above the design value, i.e. low side overrange, the sensing diaphragm moves away from the spring thereby avoiding damaging elongation of the spring and reducing potential damage to the sensing diaphragm. Further, additional negative differential pressure causes the sensing diaphragm to move into contact with a valving arrangement which causes a chamber to be formed behind the sensing diaphragm filled with fill fluid. This chamber is formed of the nonresilient body of the transmitter and once the valving mechanism prevents further flow of fill fluid, this chamber provides complete opposition to further motion of the diaphragm due to increased negative differential pressure. Distortion of the sensing diaphragm beyond its elastic limits as a result of low pressure overrange is thereby avoided.

Linearity of the transmitter requires that the sensing diaphragm be in contact with the free end of the spring when the pressures in both high and low pressure lines are equal, referred to herein as the condition of zero differential pressure. Three alternate means of biasing the diaphragm against the spring are described herein including; partial compression of the spring by spring action of the sensing diaphragm during conditions of zero differential pressure, magnetic coupling between the central hub and the spring, and the addition of a secondary spring acting in opposition to the main spring.

The position transducer acts upon a structural member affixed to the free end of the spring by means of a threaded shaft so that their relative positions may be adjusted during assembly of the device to alter the output characteristics thereof. The shaft includes a split end which prevents relative motion between the spring and shaft after adjustment.

DETAILED DESCRIPTION OF THE INVENTION

Figure 1:
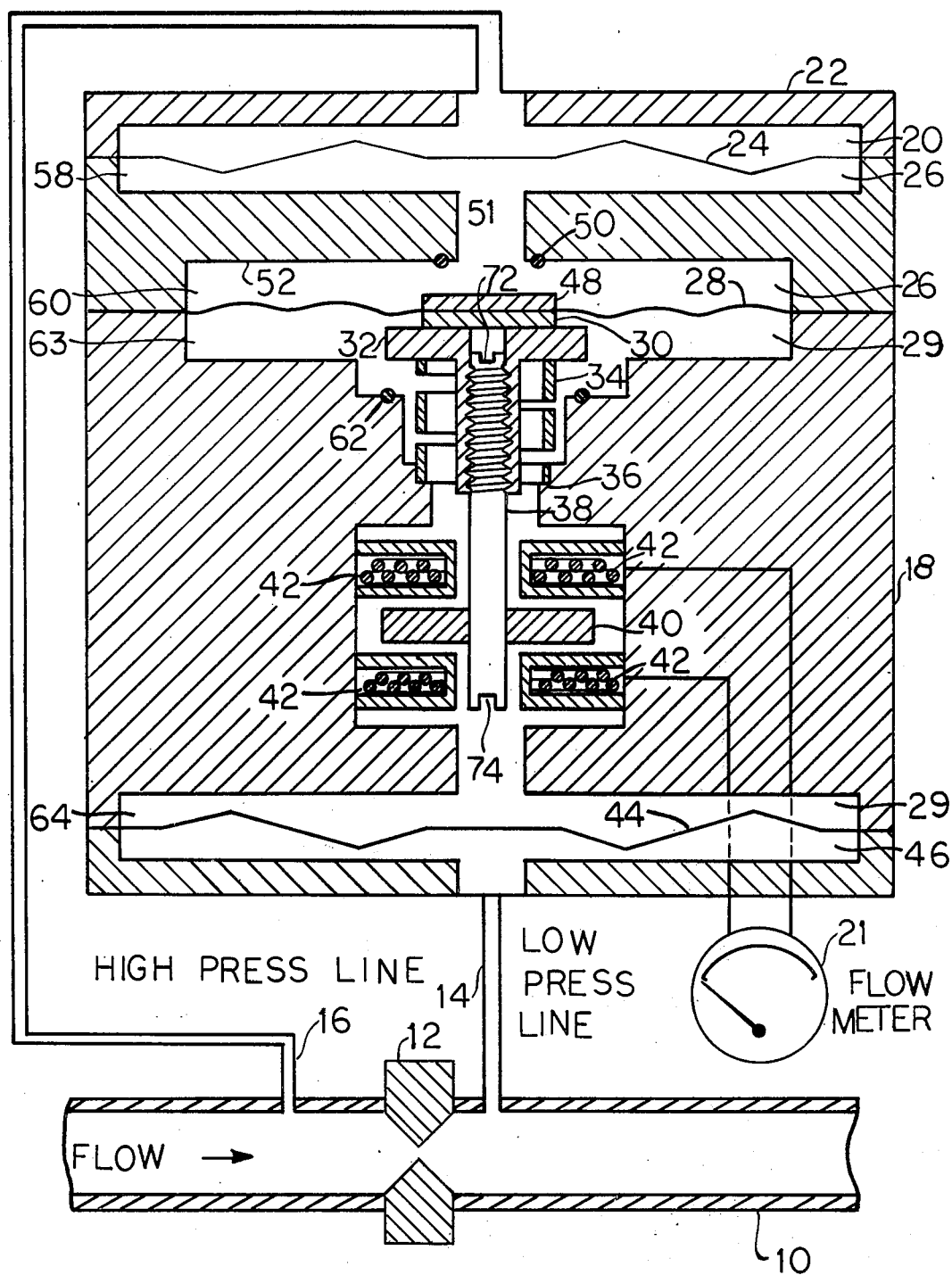
FIG. 1 is a block diagram of a flowmeter installation utilizing an orifice plate restriction in a pipeline and a differential pressure transmitter according to the instant invention shown in cross section view connected to an indicating meter.

FIG. 1 shows a block diagram of a flowmeter installation utilized to measure the flow of process fluid in pipe 10. As used herein, process fluid refers to any fluid, liquid or gaseous, for which differential pressure, however generated, is to be measured. The differential pressure in the installation shown in FIG. 1 is developed across a conventional orifice plate 12 so that low pressure is developed in low pressure line 14 and corresponding higher pressure is developed in high pressure line 16. In FIG. 1 the process fluid is assumed to flow from left to right. Lines 14 and 16 are connected to a differential pressure transmitter 18 shown in cross-sectional view constructed according to the instant invention. The output of transmitter 18 is an electrical signal which may be utilized in many ways, for example, to indicate process fluid flow rate by means of meter 21.

Pressure in high pressure line 16 is applied to chamber 20 of transmitter 18 within body 22. The pressure in chamber 20 acts against isolation diaphragm 24 which may be constructed from any conventional material of a sufficiently high flexibility so that the spring rate thereof does not adversely affect the operation of the device. Isolation diaphragm 24 operates against a relatively incompressible fill fluid, not shown, within chamber 26. The fluid in chamber 26 acts against sensing diaphragm 28 which is constructed in any conventional manner so that within the operating range of pressures applied to the transmitter its spring rate is linear. The periphery of sensing diaphragm 28, which may be circular, is firmly secured by any conventional mounting means to body 22 as shown. Affixed to the center of sensing diaphragm 28 is central hub 30 which acts against axial hub 32 affixed to the free end of spring member 34. The opposite end of spring member 34 is affixed to body 22 at point 36.

Axial hub 32 carries an axial member, such as threaded shaft 38. Movable core or armature 40 is affixed to shaft 38 adjacent the free end thereof and cooperates with stationary cores 42 to form a position transducer. By electrical means, forming no portion of this invention, a signal indicating the relative positions between movable core 40 and stationary cores 42 is developed and indicated in indicator 21.

The side of sensing diaphragm 28 which is acted upon by the fill fluid in chamber 26 is referred to herein as the high pressure face of sensing diaphragm 28. The opposite face of diaphragm 28 is referred to herein as the low pressure face and acts upon fill fluid in chamber 29 which contains spring 34 and the elements recited above which are attached thereto including movable core 40. Stationary cores 42 are likewise within chamber 29 which acts upon one face of isolation diaphragm 44. The opposite face of isolation diaphragm 44 acts upon chamber 46, to which low pressure line 14 is connected, thereby completing the differential pressure circuit.

Operation of the transmitter as an indicator or differential pressure is as follows. Pressure in high pressure line 16 is transmitted through the isolation diaphragm 24 to the high pressure side of diaphragm 28 and is opposed by the low pressure in low pressure line 14 acting through isolation diaphragm 44 against the low pressure face thereof. The positive differential pressure therefore acts to move central hub 30 of diaphragm 28 in a downward direction, as shown in FIG. 1, in opposition to the combined spring forces of spring 34 and diaphragm 28. A positive differential pressure is therefore converted into a position of movable core 40 which is transduced into a signal displayed on meter 21.

It is an important aspect of the instant invention that central hub 30 which is affixed to the low pressure face of sensing diaphragm 28 is not attached to axial hub 32 but rather releasable therefrom under conditions of low side overrange. That is, when the pressure in chamber 46 and therefore chamber 29 exceeds the pressure in chamber 20 and therefore chamber 26, sensing diaphragm 28 tends to move in an upward direction. When this condition occurs, valve member 48 affixed to the center of sensing diaphragm 28, in the manner of central hub 30, is moved upward by the fill fluid while spring member 34 extends only to its unstressed length.

These components are therefore designed so that central hub 30 will move upward away from axial hub 32 until valve member 48 contacts valve seat 50 surrounding central opening 51 in wall surface 52 of body material 22. When valve member 48 contacts valve seat 50, it prevents the fill fluid from continuing to move to the upper portion of chamber 26. This valving action therefore separates chamber 26 into two chambers; upper chamber 58 and lower chamber 60.

It can be seen that, once the valving mechanisms have been activated, the pressure of the fill fluid in lower chamber 60 increases along with any increase in pressure in chamber 29 to prevent any further increase in the differential pressure applied to sensing diaphragm 28. In this manner it can be seen that a low side overrange causes upward motion of sensing diaphragm 28 without distorting spring member 34 which is allowed to assume its unstressed length. In addition, the valving mechanisms serve to form a chamber, adjacent the high pressure face of sensing diaphragm 28, which prevents distortion thereof by opposing further motion in an upward direction.

It should be noted that under conditions of high side overrange in which the positive differential pressure exceeds the operating range of the transmitter downward motion of axial hub 32 is limited by contact with valve seat 62. A valving action similar to that above provides a separation of chamber 29 into upper chamber 63 and lower chamber 64. Pressure build up in upper chamber 63 serves to prevent distortion of sensing diaphragm 28 in a manner similar to the operation of chamber 60 under conditions of low side overrange.

Figure 2:
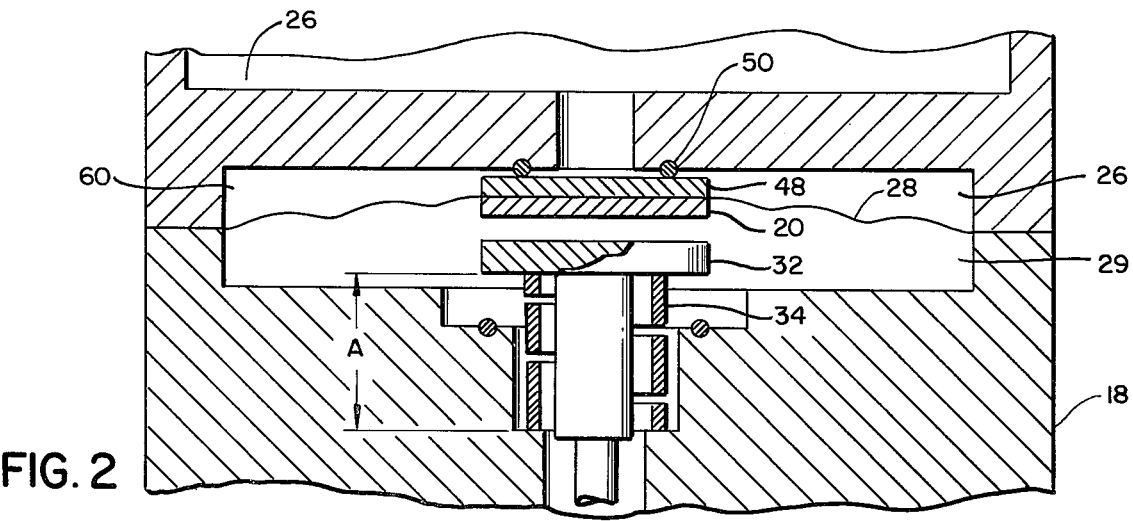
FIG. 2 is a partial cross-sectional view of a differential pressure transmitter according to the instant invention under conditions of low side overrange.

FIG. 2 is a partial cross-sectional view of transmitter 18 under conditions of low side overrange in which the pressure in chamber 29 exceeds that of the pressure in chamber 26 so that sensing diaphragm 28 is moved upward separating central hub 30 from axial hub 32. Spring 34 extends to its unstressed length shown as dimension A in FIG. 2. Therefore neither spring 34 nor its mounting to body 22 are overstressed by low side overrange. Central hub 30 is moved upward by the negative differential pressure until valve member 48 contacts valve seat 50 creating chamber 60, as described above, thereby preventing distortion of sensing diahragm 28.

Figure 3:
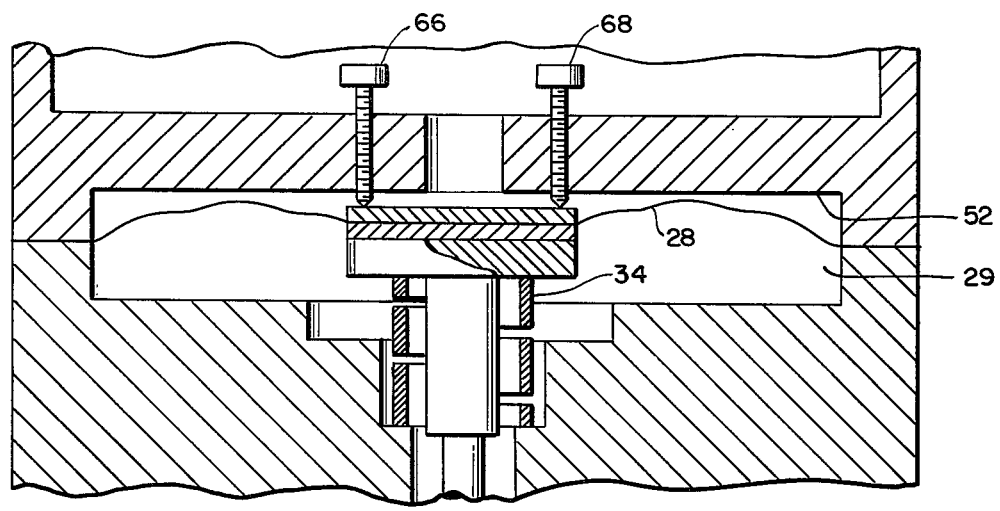
FIG. 3 is a partial cross-sectional view of a differential pressure transmitter utilizing adjustable stops and a central hub affixed to the free end of the spring in a conventional manner under low side overrange conditions.

FIG. 3 clearly shows the operation of the components under conditions of low side overrange, i.e. negative differential pressure, in devices equipped as described with reference to the prior art. Adjustable stops 66 and 68 limit travel of the central portion of sensing diaphragm 28. These stops must be carefully adjusted so that spring 34 under these conditions is not elongated past its deformation point. However, sensing diaphragm 28 may be distorted as shown by the pressure build up in chamber 29 from low side overrange. Further, expansion of diaphragm the fill fluid due to increased temperature may contribute to the pressure build up problem. It is easy to see that this deformation is potentially damaging to the linearity of the spring rate of diaphragm 28.

In order to insure linearity and therefore accuracy of the device under conditions at or near zero differential pressure it is necessary to assure that under such conditions sensing diaphragm 28 will be biased against spring 34. One method of achieving this bias, referring to FIG. 1, would be to provide magnetic attraction between central hub 30 and axial hub 32 by making one or the other or both of magnetic material. Also with reference to the same Figure, another mechanism for providing the desired bias would be by displacing spring 34 in a vertical direction so that under conditions of zero differential pressure the spring rate of sensing diaphragm 28 partially compresses spring 34.

Figure 4:
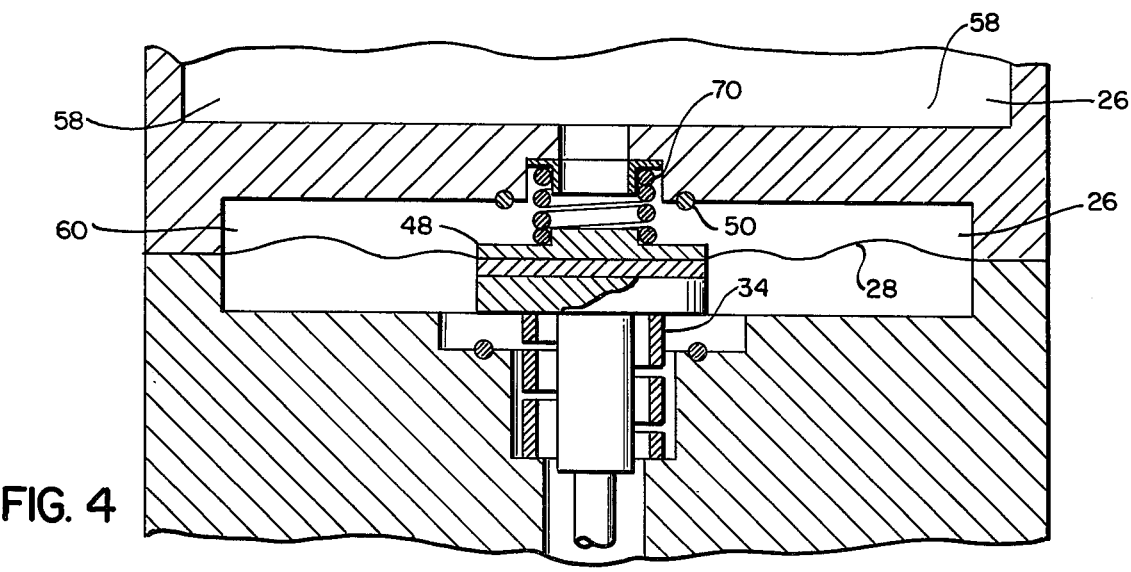
FIG. 4 is a partial cross-sectional view of a differential pressure transmitter according to the instant invention showing an alternate embodiment relating to the means for separably biasing the central hub against the free end of the spring.

An alternate mechanism for providing the bias as described above is shown in FIG. 4 in which secondary spring 70 is interposed between body 22 and valve member 48 in chamber 26. As noted above, under conditions of negative differential pressure, valve member 48 cooperates with valve seat 50 to divide chamber 26 into two chambers 58 and 60.

Referring again to FIG. 1, threaded shaft 38 is secured to axial hub 32 and therefore the free end of spring 34 by means of mating threads within hub 32. Shaft 38 is provided with slots 72 and 74 at either end thereof. Slot 72, positioned within axial hub 32, is spread apart so that shaft 38 once positioned will not accidentally move. Shaft 38 may be adjusted and positioned by insertion of a screw driver blade or other means in slot 74 to adjust the relative positions between movable core 40 and the stationary cores 42, under test conditions. This adjustment may be utilized to vary the linearity of the transducer to, for example, compensate for nonlinearities of the diaphragm-spring assembly.

I claim:

1. An improved differential pressure transmitter for indicating the difference in pressure between high and low pressure process fluid lines, of the type having a body containing a sensing diaphragm with high and low pressure faces subjected to the pressures in the high and low pressure lines respectively and a first spring affixed at one end to the body and having a free end cooperating with the low pressure face to oppose motion thereof, wherein the improvement comprises:
   a central hub mounted on the low pressure face and releasably biased against the free end of the first spring for motion separate therefrom in response to conditions of low side overrange.

2. The improved transmitter of claim 1 wherein the improvement further comprises:
   means for compressing the first spring against the central hub to releasably bias the central hub against the free end of the first spring under conditions of zero differential pressure.

3. The improved transmitter of claim 1 wherein the improvement further comprises a second spring affixed at one end to the body and having a second end cooperating with the high pressure face to oppose motion thereof to releasably bias the central hub against the free end of the first spring under conditions of zero differential pressure.

4. The improved transmitter of claim 1 wherein the central hub is releasably biased against the free end of the first spring under conditions of zero differential pressure by magnetic attraction therebetween.

5. The improved transmitter of claim 1, of the type further having a fluid filled isolation diaphragm system, wherein the improvement further comprises:
   valving means operable to form a sealed chamber adjacent the high pressure face in response to motion of the central hub separately from the first spring to minimize distortion of the sensing diaphragm under conditions of negative differential pressure.

6. The improved transmitter of claim 5 wherein the valving means comprises:
   a wall member adjacent the high pressure face affixed at its periphery to the body and having a central opening therethrough;
   a first valving member surrounding the central opening; and
   a second valving member on the high pressure face cooperating with the first valving member to seal the central opening in response to motion of the central hub separately from the first spring.

7. The improved transmitter of claim 6 wherein the improvement further comprises an axial member supported by the free end of the first spring for motion therewith; and a transducer responsive to the position of the axial member to indicate the magnitude of differential pressure applied to the sensing diaphragm.

8. The improved transmitter of claim 7 wherein the position of the axial member with respect to the second end of the first spring is adjustable to vary the response of the transducer to differential pressures applied to the sensing diaphragm.

9. The improved transmitter of claim 8 wherein the free end of the first spring includes an axial hub having a threaded opening therein and the axial member includes a threaded shaft inserted into the threaded opening whereby rotation of the threaded shaft adjusts the position of the axial member with respect to the free end of the first spring.

10. The improved transmitter of claim 9 wherein the end of the threaded shaft inserted into the threaded opening of the axial hub is split and spread apart to minimize undesired motion of the axial member with respect to the free end of the first spring.

* * * * *